(12) United States Patent
Nakamura et al.

(10) Patent No.: US 11,921,055 B2
(45) Date of Patent: Mar. 5, 2024

(54) SURFACE CHANGE DETECTOR AND SURFACE CHANGE DETECTION METHOD USING SAME

(71) Applicant: Nippon Telegraph and Telephone Corporation, Tokyo (JP)

(72) Inventors: Masahito Nakamura, Musashino (JP); Eri Matsunaga, Musashino (JP); Tadashi Minotani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 381 days.

(21) Appl. No.: 17/293,397

(22) PCT Filed: Nov. 21, 2019

(86) PCT No.: PCT/JP2019/045541
§ 371 (c)(1),
(2) Date: May 12, 2021

(87) PCT Pub. No.: WO2020/116175
PCT Pub. Date: Jun. 11, 2020

(65) Prior Publication Data
US 2022/0003688 A1  Jan. 6, 2022

(30) Foreign Application Priority Data
Dec. 5, 2018 (JP) ................. 2018-227839

(51) Int. Cl.
*G01R 27/32* (2006.01)
*G01N 22/02* (2006.01)
(Continued)

(52) U.S. Cl.
CPC ............... *G01N 22/02* (2013.01); *H01Q 1/40* (2013.01); *H01Q 1/422* (2013.01)

(58) Field of Classification Search
CPC ............ H01Q 9/28; H01Q 9/065; H01Q 1/24; H01Q 1/40; H01Q 1/422; G01N 22/02;
(Continued)

(56) References Cited

U.S. PATENT DOCUMENTS

2011/0152725 A1* 6/2011 Demir .................... A61B 5/103
600/587
2015/0047436 A1* 2/2015 Yi ........................ G01M 5/0083
73/775
(Continued)

FOREIGN PATENT DOCUMENTS

JP    2017-511490 A    4/2017
JP    2017-211269 A    11/2017

OTHER PUBLICATIONS

Takahiro Yamashita et al., *Strain Sensor Sheet for Road Infrastructure Monitoring System*, 2015 Spring Meeting of the Japan Society for Precision Engineering Academic Lecture Proceedings, Session ID: E69, Mar. 17, 2015, pp. 329-330.

*Primary Examiner* — Thang X Le
(74) *Attorney, Agent, or Firm* — Workman Nydegger (57) ABSTRACT

Provided is a surface change detection body capable of detecting a change in the surface of an object only with passive components. The surface change detection body is disposed on a surface of an object to detect a change in the surface, and includes: a sensor unit that resonates with a high-frequency signal; a signal propagation unit that propagates the high-frequency signal to the sensor unit; and an incidence and reflection unit that receives the high-frequency signal from the outside and outputs a high-frequency signal reflected from the sensor unit to the outside, the sensor unit is a parallel plate resonator in which a dielectric is interposed, and the incidence and reflection unit is an antenna having a length which is an integral multiple of one
(Continued)

fourth of an effective wavelength of a resonance frequency of the parallel plate resonator.

16 Claims, 7 Drawing Sheets

(51) Int. Cl.
*H01Q 1/40* (2006.01)
*H01Q 1/42* (2006.01)

(58) Field of Classification Search
CPC .. G01N 29/222; G01N 29/02; G01N 29/2462; G01N 29/036; G01N 33/386; G01N 33/388; G01B 7/04; G01B 7/06; G01B 7/28; G01B 15/02; G01B 15/04; G01B 15/06; G01B 15/08
See application file for complete search history.

(56) References Cited

U.S. PATENT DOCUMENTS

| | | | | |
|---|---|---|---|---|
| 2015/0276577 | A1* | 10/2015 | Ruege | G01N 22/02 |
| | | | | 324/71.2 |
| 2016/0013533 | A1* | 1/2016 | Chiang | H01P 7/08 |
| | | | | 333/204 |
| 2017/0030825 | A1* | 2/2017 | Goodwin | G01N 17/04 |
| 2017/0131033 | A1* | 5/2017 | Bayram | G01N 22/02 |
| 2020/0182721 | A1* | 6/2020 | Plesski | G01L 9/0016 |

* cited by examiner

SURFACE CHANGE DETECTOR AND SURFACE CHANGE DETECTION METHOD USING SAME

TECHNICAL FIELD

The present invention relates to a technique of detecting the occurrence of a crack, peeling, deformation, and the like on the surface of an object.

BACKGROUND ART

A wide variety of objects ranging from large-scale equipment such as infrastructures and plant equipment to familiar products such as vehicles, playground equipment, and household furniture deteriorate over time. When the deterioration is left as it is, the deterioration causes the occurrence of, for example, bridge collapse accidents, leakage of gas and liquid from joints, breakage of playground equipment, accidents resulting in injury or death due to objects falling from high places, or the like.

Preventative maintenance is required to prevent these accidents. To preventatively maintain an object such as a structure, it is necessary to inspect the degree of deterioration of the object. Examples of the inspection method include a visual inspection and a hammering inspection. In addition, a method of performing electrical detection using a piezoelectric strain sensor sheet has also been examined (for example Patent Literature 1).

CITATION LIST

Non Patent Literature

Non Patent Literature 1: Takahiro Yamashita and two others, "Strain sensor sheet for road infrastructure monitoring system," 2015, Spring Conference Academic Lecture Proceedings of National Institute of Advanced Industrial Science and Technology, NMEMS Technology Research Organization, session ID: E69, p. 329-p. 330

SUMMARY OF THE INVENTION

Technical Problem

However, in the method disclosed in Patent Literature 1, there is a problem in that an active element (sensor chip) and a power supply are required for each sensor sheet (object), which leads to a high cost.

The present invention has been made in view of such a problem, and an object thereof is to provide a surface change detection body and a surface change detection method using the same which make it possible to detect a change in the surface of an object only with passive components without using an active element and a power supply for each object to be detected.

Means for Solving the Problem

According to an aspect of the present invention, there is provided a surface change detection body disposed on a surface of an object and configured to detect a change in the surface, the surface change detection body including: a sensor unit configured to resonate with a high-frequency signal; a signal propagation unit configured to propagate the high-frequency signal to the sensor unit; and an incidence and reflection unit configured to receive the high-frequency signal from an outside and output a high-frequency signal reflected from the sensor unit to the outside.

In addition, according to an aspect of the present invention, there is provided a surface change detection method executed by a detection device configured to detect a change in a surface of an object, including: sweeping a high-frequency signal having a frequency in a predetermined range to irradiate the surface change detection body; analyzing a frequency of a high-frequency signal reflected from the surface change detection body; and obtaining an amount of change by comparing a peak value obtained in the analyzing with a peak value obtained in a past and determining that there is a change in the surface of the object in a case where the amount of change is equal to or greater than a threshold.

Effects of the Invention

According to the present invention, it is possible to provide a surface change detection body and a surface change detection method using the same which make it possible to detect a change in the surface of an object only with passive components.

BRIEF DESCRIPTION OF DRAWINGS

FIGS. 2(*a*) and 2(*b*) are diagrams schematically illustrating an example of frequency characteristics that change with a change in the surface of an object.

FIGS. 7(*a*)-7(*c*) are diagrams illustrating a modification example of the surface change detection body according to the embodiment of the present invention.

DESCRIPTION OF EMBODIMENTS

Hereinafter, an embodiment of the present invention will be described with reference to the accompanying drawings. The same components in a plurality of drawings are denoted by the same reference signs, and thus the detailed description thereof will not be repeated.

Surface Change Detection Body
Configuration

Figure 1:
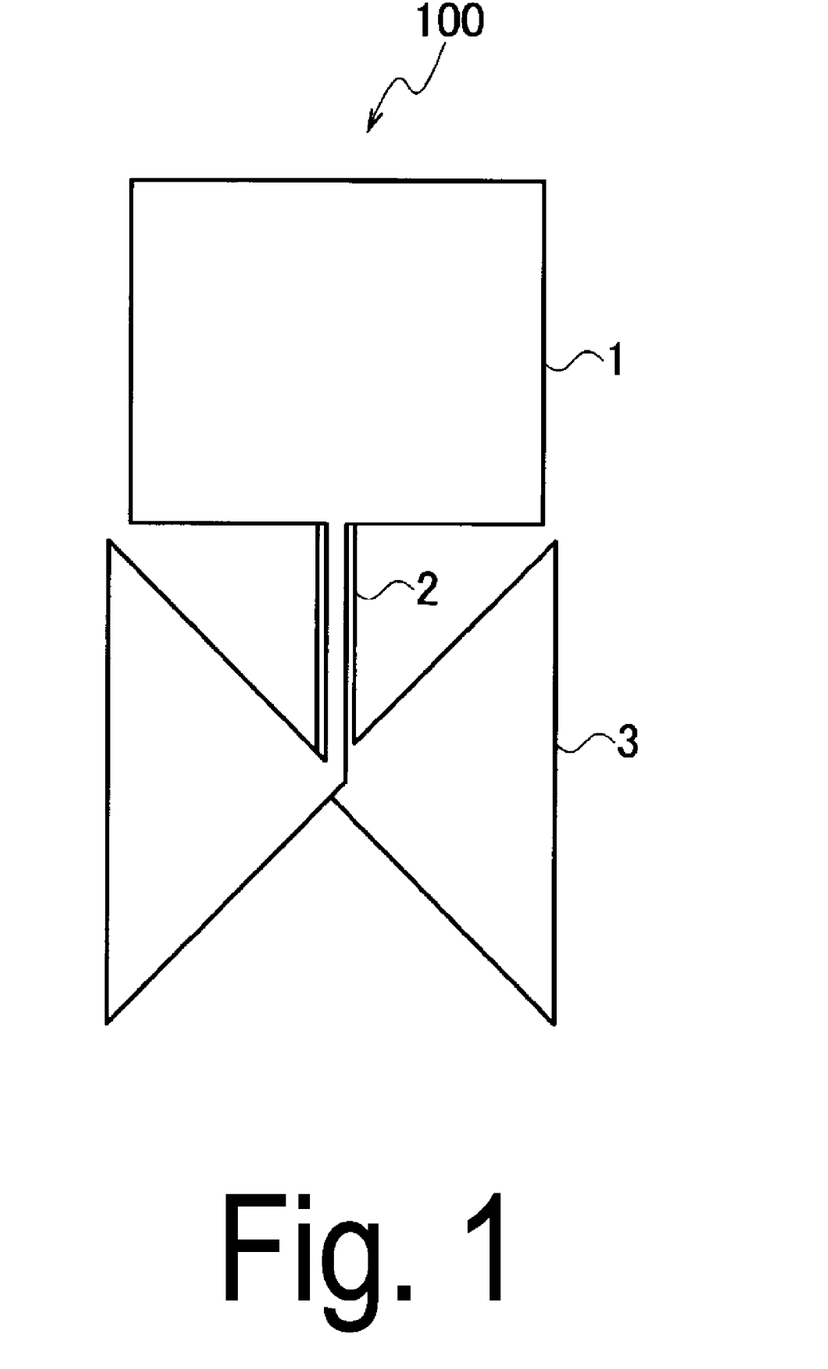
FIG. 1 is a plan view illustrating an example of a surface change detection body according to an embodiment of the present invention.

FIG. 1 is a plan view illustrating an example of a surface change detection body according to the embodiment of the present invention. A surface change detection body 100 shown in FIG. 1 is disposed in close contact with the surface of an object such as, for example, an infrastructure, and detects a change in the surface of the object.

The wording "disposed in close contact" refers to a case in which the surface change detection body 100 is formed by, for example, paint being applied onto the surface of the object. Alternatively, it refers to a case in which the surface change detection body 100 is disposed adhesively to the surface of the object.

The surface change detection body 100 includes a sensor unit 1, a signal propagation unit 2, and an incidence and reflection unit 3. The sensor unit 1 resonates with a high-frequency signal. The signal propagation unit 2 propagates the high-frequency signal to the sensor unit 1. The incidence and reflection unit 3 receives the high-frequency signal from the outside, and outputs a high-frequency signal reflected from the sensor unit 1 to the outside. The high-frequency signal may be electromagnetic waves, or may be ultrasonic waves.

In the following, a case in which the high-frequency signal is electromagnetic waves will be described as an example.

The sensor unit 1 has a structure inside which the electromagnetic waves can propagate. For example, the sensor unit includes a three-layer parallel plate resonator of conductor-dielectric-conductor in which a dielectric is interposed between conductive materials. An elastic body is substituted for the dielectric in a case where the high-frequency signal is ultrasonic waves.

The sensor unit 1 shown in FIG. 1 is configured such that, for example, its planar shape is quadrilateral and the length of one side is 10 cm. The details will be described later.

The signal propagation unit 2 connects the sensor unit 1 and the incidence and reflection unit 3. In a case where the high-frequency signal is electromagnetic waves, the signal propagation unit 2 is constituted by any of a microsplit line, a coplanar line, a dielectric waveguide, and the like.

The signal propagation unit 2 shown in FIG. 1 is an example of a microsplit line. In a case where the width of the conductive pattern of a lowermost layer (first layer) is, for example, 1.7 mm, and the dielectric of the sensor unit 1 is a second layer, the width of the conductive pattern of a third layer which is an uppermost layer is, for example, 0.85 mm. Meanwhile, there is no dielectric (second layer) in a portion of the signal propagation unit 2. The width of the conductive pattern of the signal propagation unit 2 is set to have a characteristic impedance of approximately 50Ω.

The incidence and reflection unit 3 receives a high-frequency signal which is radiated from the outside, and outputs reflection waves of a high-frequency signal reflected by the sensor unit 1 to the outside. The incidence and reflection unit 3 can be constituted by an antenna capable of being formed of a metal thin film and a dielectric such as a dipole antenna, a patch antenna, a spiral antenna, a meander line antenna, a chip antenna, or a bow-tie antenna.

The incidence and reflection unit 3 shown in FIG. 1 is an example of a bow-tie antenna. The bow-tie antenna has a shape in which conductive patterns each having a planar shape of an isosceles right triangle are brought into contact at the vertices with the bottoms disposed in parallel with each other. A length obtained by connecting the hypotenuses of both triangles is set to a length which is an integral multiple of one fourth of the effective wavelength of the resonance frequency of the sensor unit 1 which is a parallel plate resonator.

The effective wavelength is a wavelength obtained in consideration of the dielectric constant $\varepsilon_r$ of the dielectric of the second layer. That is, it is the wavelength of a high-frequency signal that propagates through the sensor unit 1.

As described above, the sensor unit 1, the signal propagation unit 2, and the incidence and reflection unit 3 can be made of a metal thin film, a dielectric, or the like, and do not require an active element in each of the constituent portions.

Operation

When the surface change detection body 100 is irradiated with a high-frequency signal from the outside, the high-frequency signal is received by the incidence and reflection unit 3, propagates through the signal propagation path 2, and reaches the sensor unit 1. The high-frequency signal that has reached the sensor unit 1 resonates within the sensor unit 1 when the frequency of the signal coincides with the resonance frequency of the sensor unit 1.

When the frequency of the high-frequency signal with which the surface change detection body 100 is irradiated from the outside is swept in a predetermined range including the resonance frequency of the sensor unit 1, a frequency component that coincides with the resonance frequency is trapped within the sensor unit 1. Frequencies other than the resonance frequency are then reflected and output from the incidence and reflection unit 3 to the outside as reflection waves.

Because the sensor unit 1 is in close contact with the surface of an object, the resonance frequency changes due to a change in the surface (such as a crack, peeling, or contact with another object). Consequently, by comparing the reflection characteristics when the surface of an object is normal immediately after the surface change detection body 100 is brought into close contact with the object with the reflection characteristics when the surface of the object deteriorates over time, the presence or absence of a change in the surface of the object can be detected.

The characteristic $R_t$ of reflection waves received by a detection device (not shown) is expressed by the following expression, for example, in a case where transmission waves are microwaves to millimeter waves in 10 MHz to 100 GHz band. The detection device will be described later.

Math. 1

$$R_t = [T_{ant1}] \cdot [T_{space}] \cdot [T_{ant2}] \cdot [T_{tml}] \cdot [T_{sens}] \quad (1)$$

Here, T is a T parameter or a characteristic parameter of a two-terminal circuit network which is represented by an F parameter or the like, ant1, which is a suffix, means a transmission unit of the detection device, space means a free space between the surface change detection body 100 and the detection device, ant2 means the incidence and reflection unit 3, tml means the signal propagation unit 2, and sens means the sensor unit 1.

Figure 2A:
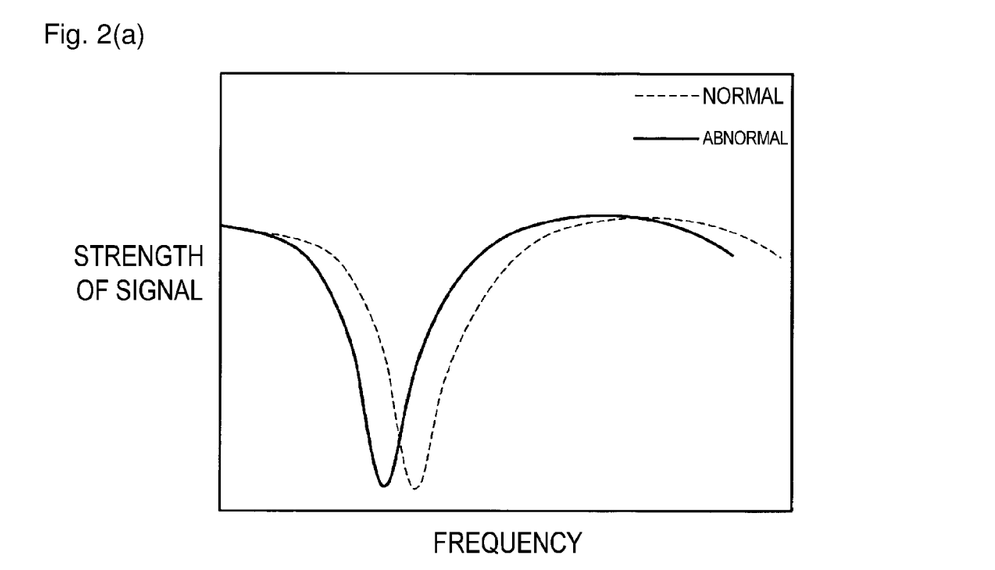
Figure 2B:
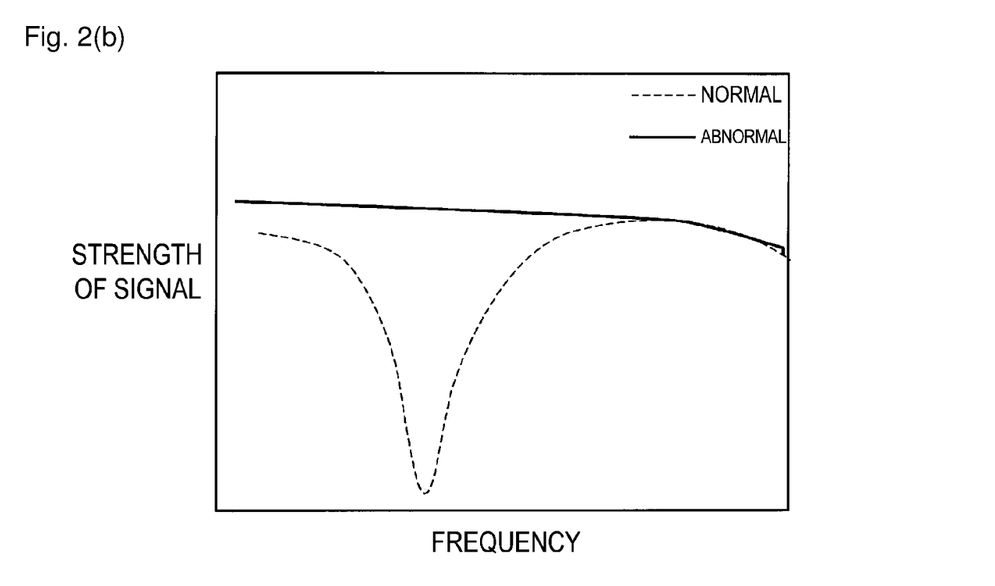

FIG. 2 is a diagram schematically illustrating a change in the characteristic $R_t$ of reflection waves to be received. The horizontal axis in FIG. 2 is frequency, and the vertical axis is the strength of a signal (reflection waves).

FIG. 2(a) shows an example in which a change in the surface of an object appears as a change in resonance frequency. In FIG. 2(a), the broken line indicates the characteristic $R_t$ of the reflection waves in a case where the surface is normal, and the solid line indicates the characteristic $R_t$ of the reflection waves in a case where the surface is abnormal. A relationship between normal and abnormal resonance frequencies may be reversed.

FIG. 2(b) shows an example of a change in characteristics when the signal transmission path 2 is disconnected. As shown in FIG. 2(b), when the signal transmission path 2 is disconnected, a decrease in the signal strength of the resonance frequency does not appear in the characteristic $R_t$ of the reflection waves.

As described above, it is possible to detect whether there is a change in the surface of the object on the basis of the characteristic $R_t$ of the reflection waves of the high-frequency signal with which the surface change detection body 100 is irradiated.

Method of Making Surface Change Detection Body

Figure 3:
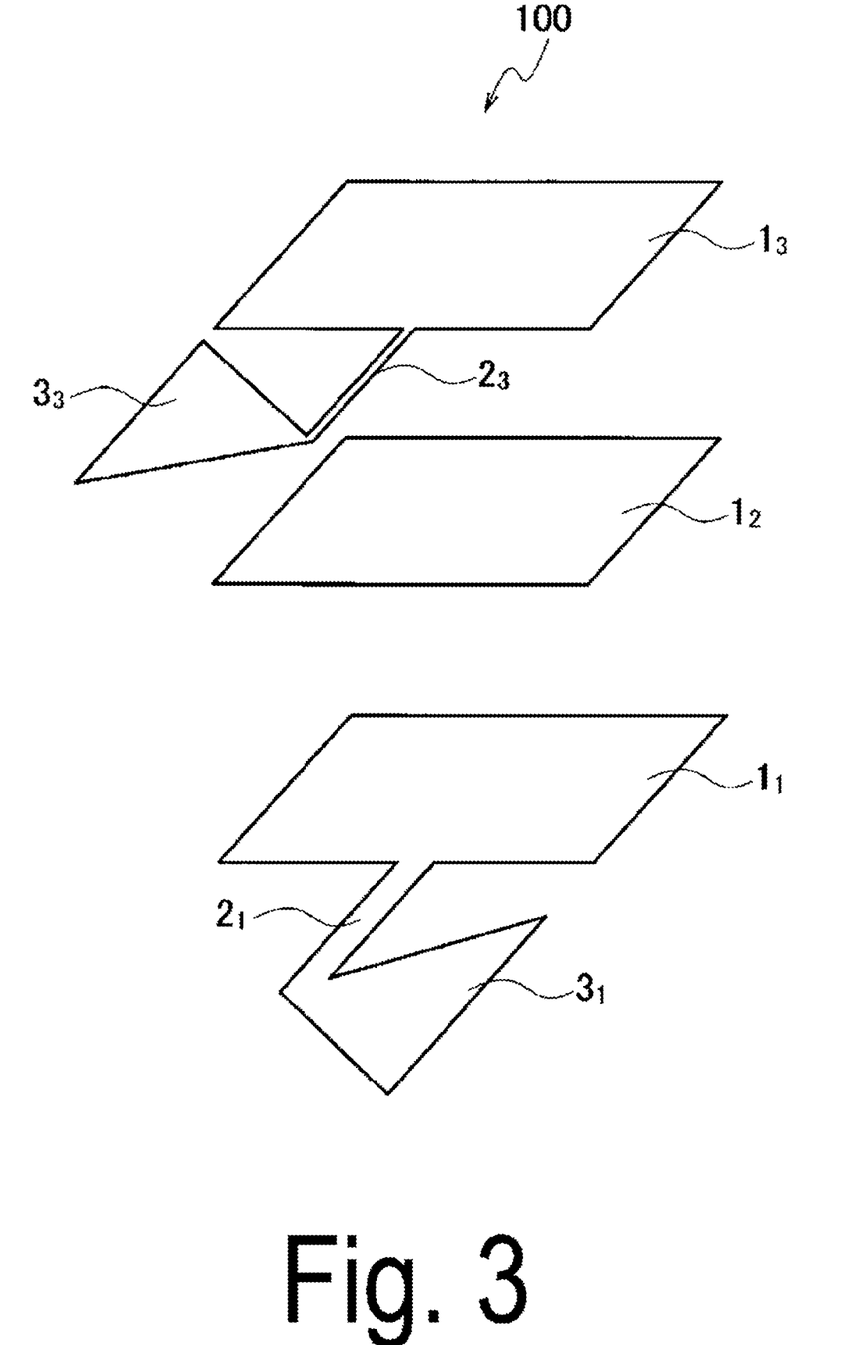
FIG. 3 is a diagram schematically illustrating an example of a process of making the surface change detection body shown in FIG. 1.

The surface change detection body 100 can be made, for example, through three coating processes. FIG. 3 is a diagram schematically illustrating a state in which the surface change detection body 100 is made by recoating of a coating film.

In FIG. 3, the denotation of the object is omitted. The layer number of each coating film applied in three coating processes is denoted by a suffix number.

As shown in FIG. 3, a sensor unit $1_1$, a signal propagation unit $2_1$, and an incidence and reflection unit $3_1$ of a first layer are formed by directly applying, for example, a silver paste onto the surface of an object (for example, infrastructure). Meanwhile, a material to be applied is not limited to a silver paste. Any of a copper paste, a conductive polymer, a conductive ink, and the like may be used.

Next, a dielectric film $1_2$ having the same shape as the sensor unit $1_1$ is applied onto the sensor unit $1_1$ of the first layer. The dielectric film is formed of, for example, a polymer resin. The thickness of the dielectric film $1_2$ influences characteristic impedance and thus is required to have a thickness where the characteristic impedance matches. The thickness of the dielectric film $1_2$ is, for example, approximately 400 μm.

A sensor unit $1_3$, a signal propagation unit $2_3$, and an incidence and reflection unit $3_3$ of a third layer are applied onto the dielectric film $1_2$ of the second layer. A material which is applied as the third layer is, for example, the same silver paste as the first layer. The shape of the incidence and reflection unit $3_3$ of the third layer and the shape of the incidence and reflection unit $3_1$ of the first layer are line-symmetric with respect to the central line of the signal propagation unit 2 interposed therebetween.

The incidence and reflection unit $3_1$ of the first layer and the incidence and reflection unit $3_3$ of the third layer in this example are not directly connected to each other. That is, the incidence and reflection unit 3 is a bow-tie antenna having a planar shape of isosceles right triangles, and each triangle of the bow-tie antenna is formed from a separate conductor pattern. Thereby, a self-complementary antenna is configured, and the bandwidth of a signal can be increased.

Meanwhile, both triangles of the bow-tie antenna may be formed from one conductive pattern. The configuration of the incidence and reflection unit 3 including the shape thereof is appropriately selected according to the required specifications.

In a case where the width of the signal propagation unit $2_1$ of the first layer is set to, for example, 1.7 mm, and the thickness of the dielectric film $1_2$ is set to 400 μm, the width of the signal propagation unit $2_3$ is set to 0.85 mm. This makes it possible for the incidence and reflection unit 3 and the sensor unit 1 to be impedance-matched at a characteristic impedance of 50Ω.

In this manner, the surface change detection body 100 can be made, for example, through three coating processes. According to this making method, the surface change detection body 100 can also be disposed in close contact with an object having a curved surface.

In addition, the surface change detection body 100 may not be configured by coating. For example, the surface change detection body 100 may be configured by stacking three sheets.

When the surface change detection body 100 is made by stacking sheets, conductive sheets and an insulating sheet having the shapes of respective layers shown in FIG. 3 are integrated with each other. The integrated surface change detection body 100 is attached to the surface of an object.

An adhesive for attaching the surface change detection body 100 to the surface of an object may be applied at a place where the object is located, or the surface of the surface change detection body 100 on the object side may be formed as a paste-applied surface in advance. That is, the surface of the surface change detection body 100 on the object side may be a paste-applied surface. This can make it easy for the surface change detection body 100 to be disposed on the object.

Detection Device

Figure 4:
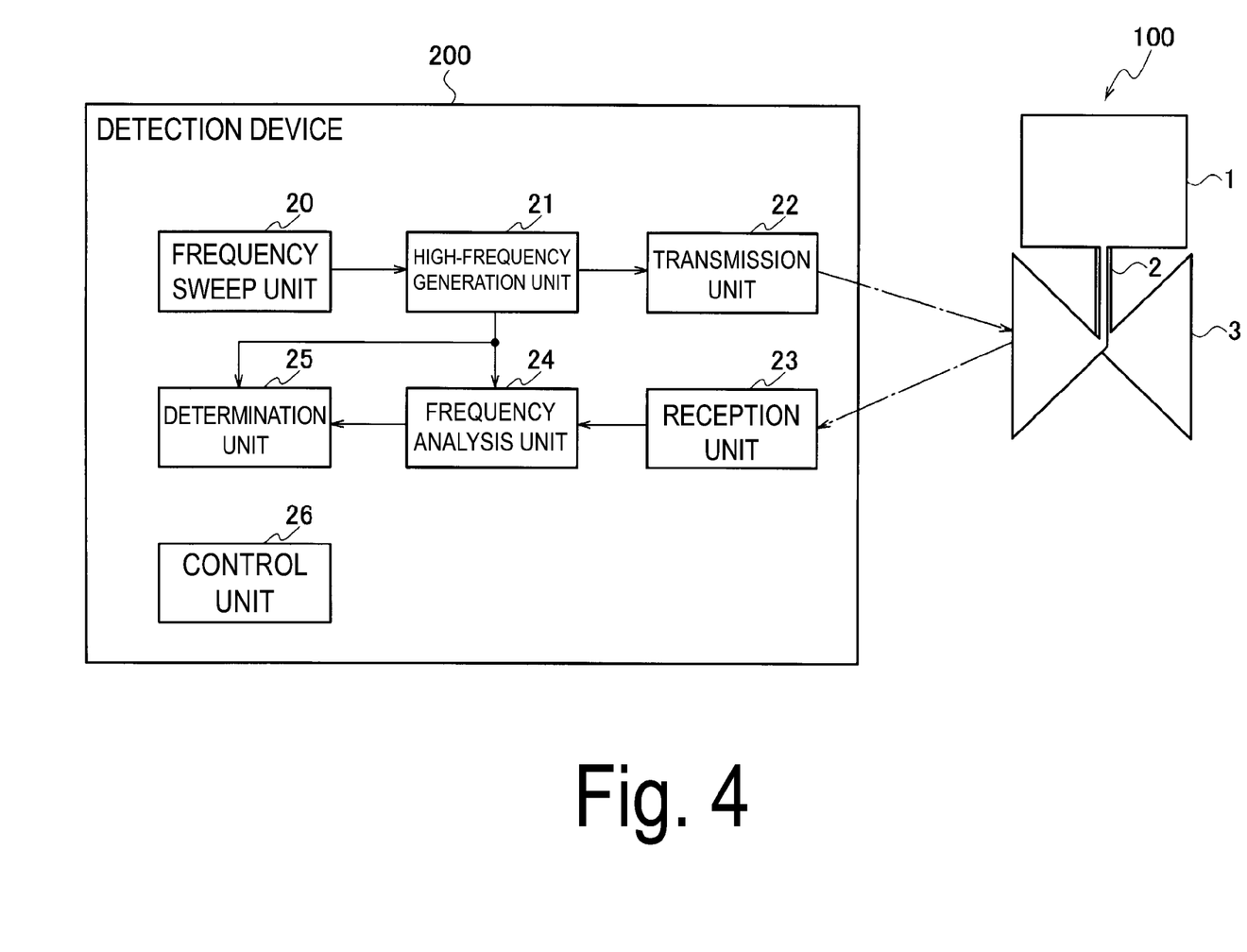
FIG. 4 is a block diagram illustrating a configuration example of a detection device according to the embodiment of the present invention.
Figure 5:
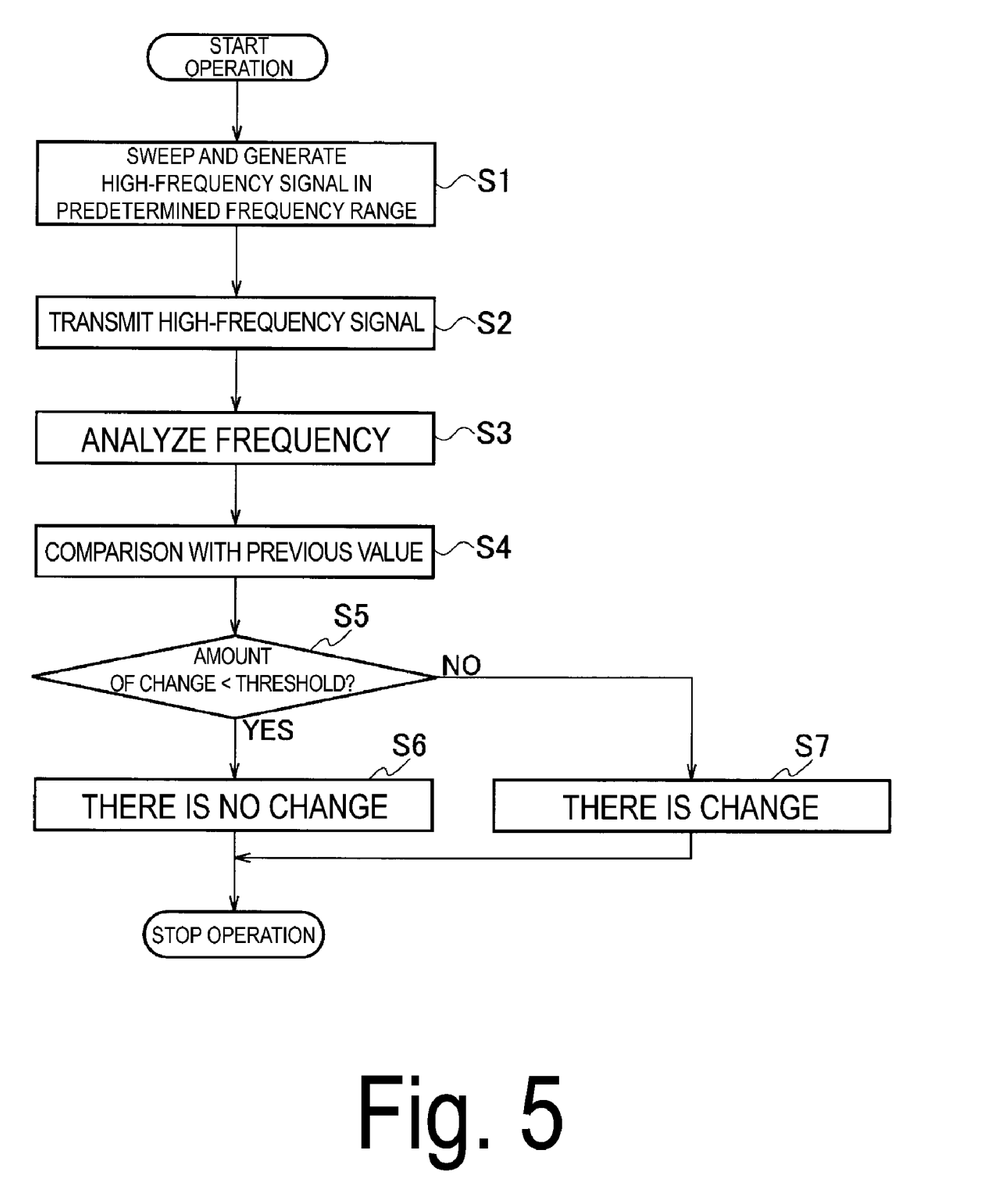
FIG. 5 is a flowchart illustrating a processing procedure of a surface change detection method performed by the detection device shown in FIG. 4.

FIG. 4 is a block diagram illustrating a configuration example of a detection device according to the embodiment of the present invention. FIG. 5 is a flowchart illustrating its processing procedure.

A detection device 200 includes a frequency sweep unit 20, a high-frequency generation unit 21, a transmission unit 22, a reception unit 23, a frequency analysis unit 24, a determination unit 25, and a control unit 26. The control unit 26 is a functional configuration unit that controls an operation of each functional configuration unit, and can be constituted by, for example, a computer including a ROM, a RAM, a CPU, and the like. In a case where the control unit 26 is implemented by a computer, a portion of the frequency sweep unit 20, the frequency analysis unit 24, and the determination unit 25 can also be constituted by the computer.

The detection device 200 transmits a high-frequency signal to the incidence and reflection unit 3 of the surface change detection body 100. The frequency sweep unit 20 sweeps a frequency in a predetermined range. The high-frequency generation unit 21 generates a high-frequency signal of the frequency which is swept by the frequency sweep unit 20 (step S1).

The transmission unit 22 transmits the high-frequency signal generated by the high-frequency generation unit 21 to the incidence and reflection unit 3 of the surface change detection body 100 (step S2). The transmitted high-frequency signal acts as described above on the surface change detection body 100, and is received by the detection device 200 as reflection waves.

The magnitude of the strength of the reflection waves received by the reception unit 23 is analyzed by the frequency analysis unit 24 for each frequency (step S3). The magnitude of the signal strength of the reflection waves for each frequency can be obtained by performing, for example, a fast Fourier transform (FFT) on the received reflection waves in a time domain.

The determination unit 25 obtains the amount of change by comparing a peak value obtained by the frequency analysis unit 24 with a peak value obtained in the past (step S4). In addition to a method of simply taking a difference, the amount of change may be determined using a method of calculating a cross correlation, or, in the case of a spectrum in which the number of pieces of data exceeds ten, a multivariate analysis technique such as linear regression, multiple regression, PLS regression, or main component regression, a neural network, or the like.

Figure 6:
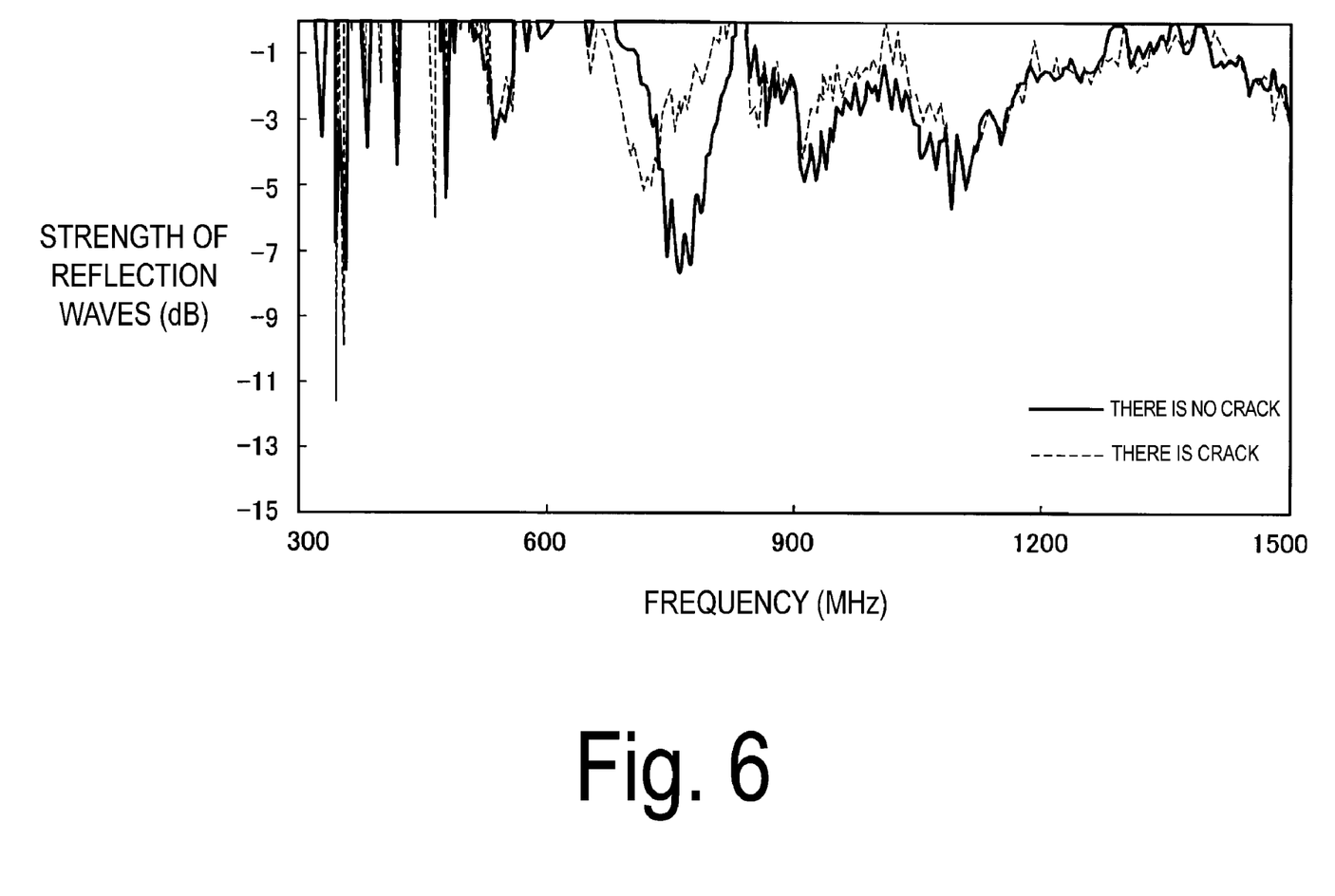
FIG. 6 is a diagram illustrating an example of characteristics measured by the detection device shown in FIG. 4.

FIG. 6 is a diagram illustrating a specific example showing a difference between the signal strengths of reflection waves when there is no crack on the surface of an object and when there is a crack thereon. The horizontal axis in FIG. 6 is frequency (MHz), and the vertical axis is the signal strength (dB) of the reflection waves. It can be seen that the frequency at which the peak value is generated is changed from the vicinity of approximately 770 MHs to approximately 700 MHz due to the occurrence of a crack. A change in the surface of an object can be detected through such a change in the peak value.

The determination unit 25 determines that there is no change in the surface of the object in a case where the amount of change is less than a threshold (step S6), and determines that there is a change in the surface of the object in a case where the amount of change is equal to or greater than the threshold (step S7).

The surface change detection method executed by the detection device 200 according to the present embodiment as described above is a surface change detection method executed by a detection device that detects a change in the surface of an object as will be described below. The surface change detection body 100 relating to the detection device includes the sensor unit 1 that resonates with a high-frequency signal, the signal propagation unit 2 that transmits the high-frequency signal to the sensor unit 1, and the incidence and reflection unit 3 that receives the high-frequency signal from the outside and reflects a high-frequency signal reflected from the sensor unit 1 to the outside. The detection device performs a high-frequency sweeping and transmitting step S2 of sweeping and transmitting a high-frequency signal having a frequency in a predetermined range, a frequency analysis step S3 of analyzing a frequency of a high-frequency signal reflected from the surface change detection body 100, and determination steps S5 to S7 of obtaining an amount of change by comparing a peak value obtained in the frequency analysis step S3 with a peak value obtained in the past and determining that there is a change in the surface of an object in a case where the amount of change is equal to or greater than a threshold.

This makes it possible to detect a change in the surface of the object.

Modification Example of Surface Change Detection Body

Figure 7A:
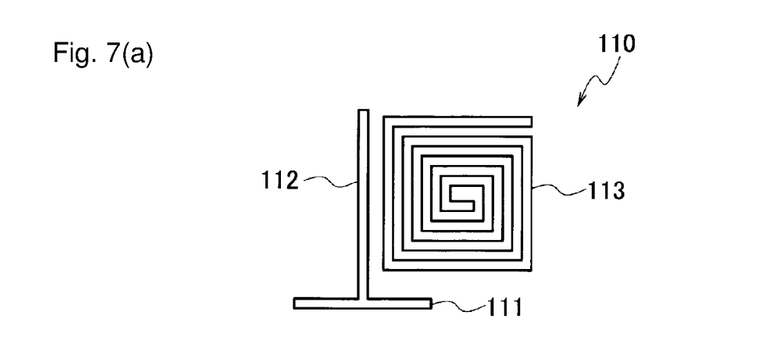
Figure 7B:
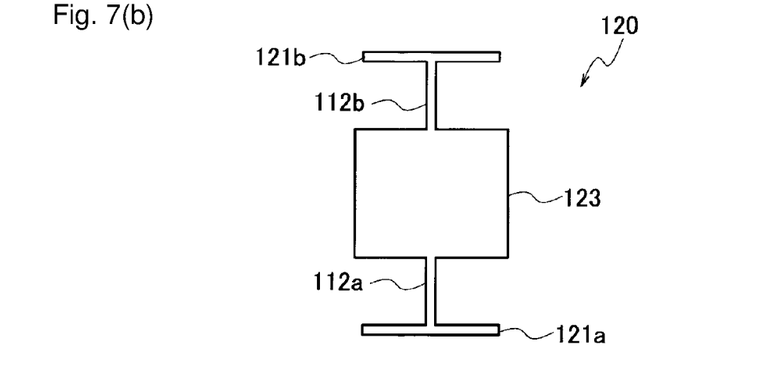
Figure 7C:
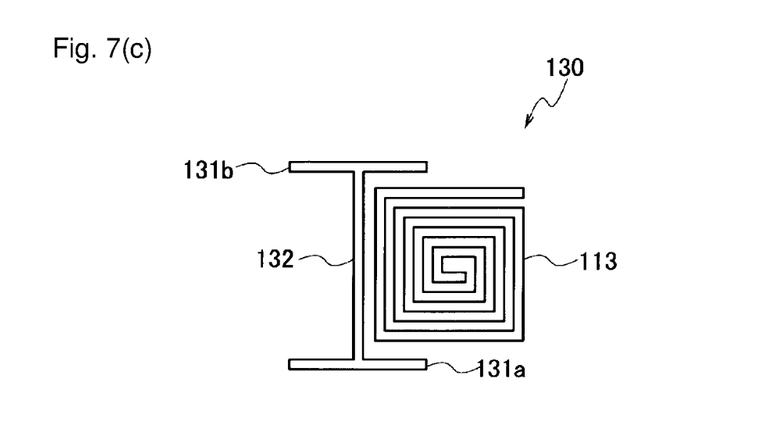

FIG. 7 is a diagram illustrating a modification example in which the shape of the surface change detection body 100 (FIG. 1) is changed.

FIG. 7(a) is a plan view of a surface change detection body 110 in which the sensor unit 1 is formed as a spiral-shaped resonator 113, and the resonator 113 and a signal propagation unit 112 are electromagnetically coupled to each other. In this manner, the sensor unit 1 is not limited to a parallel plate resonator. In addition, the signal propagation unit 112 and the sensor unit need not be connected to each other by a conductive pattern.

FIG. 7(b) is a plan view of a surface change detection body 120 provided with two incidence and reflection units 3 for reception of a high-frequency signal and transmission of reflection waves. With such a configuration, reflection waves and input waves can be separated from each other, and the presence or absence of a change in the surface of an object can be easily determined.

FIG. 7(c) is a plan view of a surface change detection body 130 provided with a spiral-shaped resonator 113 and two incidence and reflection units 3 for reception of a high-frequency signal and transmission of reflection waves. In this manner, the spiral-shaped resonator 113 and two incidence and reflection units 133a and 133b may be combined.

As described above, according to the surface change detection body of the present embodiment and the surface change detection method using the same, it is possible to determine the presence or absence of a change in the surface of an object on the basis of a change in frequency characteristics. In addition, in a case where the detection device 200 according to the present embodiment is mounted on a radio-controlled unmanned craft (drone), it is possible to detect a change in the frequency characteristics of the surface change detection body 100 disposed at, for example, a high place of an infrastructure. Thus, the surface change detection method of the present invention is suitable for inspection of a place where it is difficult for a person to approach an object to be inspected or a portion at a distance where visual inspection is difficult.

In addition, the surface change detection body 100 can be formed by recoating of paint or stacking of a plurality of sheets, and does not include electronic parts. Thus, it is possible to reduce costs.

In addition, the surface change detection body 100 operates with energy supplied from the outside, and thus does not require a power supply. Further, because it is also easy to change the shape of the surface change detection body 100 in accordance with the shape of the surface of an object to be inspected, the surface change detection body can be easily disposed on structures having a variety of surface shapes. Therefore, the present invention can contribute to automation and cost reduction of inspection tasks in social infrastructures having many concrete structures or the like.

Meanwhile, although a bow-tie antenna has been described as an example of the shape of the incidence and reflection unit 3, the present invention is not limited to this example. The incidence and reflection unit 3 may be constituted by, for example, a patch antenna. In addition, although electromagnetic waves have been described as an example of the high-frequency signal, it may be ultrasonic waves. Even in a case where ultrasonic waves are used, the technical idea of the present invention can be applied as it is.

In this manner, the present invention is not limited to the above-described embodiment, and can be changed or modified within the scope of the invention.

REFERENCE SIGNS LIST

1, $1_1$, $1_2$, $1_3$, 111, 121 Sensor unit
2, $2_1$, $2_3$, 112, 112a, 112b, 132 Signal propagation unit
3, $3_1$, $3_3$, 113, 123a, 123b, 133a, 133b Incidence and reflection unit
20 Frequency sweep unit
21 High-frequency generation unit 21
22 Transmission unit
23 Reception unit
24 Frequency analysis unit
25 Determination unit
26 Control unit
100, 110, 120, 130 Surface change detection body
200 Detection device

The invention claimed is:

1. A surface change detection body disposed on a surface of an object and configured to detect a change in the surface, the surface change detection body comprising:
  a sensor unit configured to resonate with a high-frequency signal;
  a signal propagation unit configured to propagate the high-frequency signal to the sensor unit; and
  an incidence and reflection unit configured to receive the high-frequency signal from an outside and output a reflected high-frequency signal reflected from the sensor unit to the outside;

wherein the sensor unit is a parallel plate resonator in which a dielectric is interposed; and wherein the incidence and reflection unit is an antenna having a length which is an integral multiple of one fourth of an effective wavelength of a resonance frequency of the parallel plate resonator.

2. The surface change detection body according to claim 1, wherein the antenna is a bow-tie antenna having a planar shape of isosceles right triangles, each of the triangles of the bow-tie antenna being formed from a separate conductor pattern.

3. The surface change detection body according to claim 1, wherein a surface of the surface change detection body on a side of the object is a paste-applied surface.

4. A surface change detection method executed by a detection device configured to detect a change in a surface of an object, comprising:

sweeping a high-frequency signal having a frequency in a predetermined range to irradiate a surface change detection body disposed on the surface of the object, the surface change detection body including a sensor unit configured to resonate with the high-frequency signal, a signal propagation unit configured to propagate the high-frequency signal to the sensor unit, and an incidence and reflection unit configured to receive the high-frequency signal from an outside and output a reflected high-frequency signal reflected from the sensor unit to the outside, wherein the sensor unit comprises a conductive first layer, a conductive second layer, and a dielectric film sandwiched directly between the first layer and the second layer;

analyzing a frequency of the reflected high-frequency signal reflected from the surface change detection body; and obtaining an amount of change by comparing a peak value obtained in the analyzing with a peak value obtained in a past and determining that there is a change in the surface of the object when the amount of change is equal to or greater than a threshold.

5. The surface change detection method as recited in claim 4, wherein the first layer of the sensor unit is in the form of a sheet having a bottom surface that is uniformly secured to the surface of the object by an adhesive.

6. The surface change detection method as recited in claim 4, wherein the first layer of the sensor unit is formed by applying a layer of conductive paste or conductive liquid directly on the surface of the object.

7. The surface change detection method as recited in claim 6, wherein the conductive paste or conductive liquid comprises a silver paste, copper paste, conductive polymer, or conductive ink.

8. The surface change detection method as recited in claim 4, wherein the incidence and reflection unit comprises a bow-tie antenna having a planar shape of isosceles right triangles, each of the triangles of the bow-tie antenna being formed from a separate conductor pattern.

9. The surface change detection method as recited in claim 4, wherein the sensor unit is a parallel plate resonator in which a dielectric is interposed; and the incidence and reflection unit is an antenna having a length which is an integral multiple of one fourth of an effective wavelength of a resonance frequency of the parallel plate resonator.

10. A surface change detection body disposed on a surface of an object and configured to detect a change in the surface, the surface change detection body comprising:

a first layer disposed on the surface of the object, the first layer comprising a first sensor unit portion, a first signal propagation portion, and a first incidence and reflection unit portion;

a dielectric film overlayed on top of first sensor unit portion; and a second layer comprising:
a second sensor unit portion overlayed on top of the dielectric film, wherein the first sensor unit portion, the dielectric film, and the second sensor unit portion combine to form a sensor unit configured to resonate with a high-frequency signal;

a second signal propagation portion, wherein the first signal propagation portion and the second signal propagation portion combine to form a signal propagation unit configured to propagate the high-frequency signal to the sensor unit; and a second incidence and reflection unit portion, wherein the first incidence and reflection unit portion and the second incidence and reflection unit portion combine to form an incidence and reflection unit configured to receive the high-frequency signal from an outside and output a reflected high-frequency signal reflected from the sensor unit to the outside.

11. A surface change detection body according to claim 10, wherein the first layer comprises a continuous sheet of a conductive material that is uniformly secured to the surface of the object by an adhesive.

12. A surface change detection body according to claim 10, wherein the first layer comprises a conductive paste or liquid disposed directly on the surface of the object.

13. A surface change detection body according to claim 10, wherein the first layer comprises a silver paste, copper paste, conductive polymer, or conductive ink disposed directly on the surface of the object.

14. A surface change detection body according to claim 10, wherein the second signal propagation portion is overlayed on top of the first signal propagation portion.

15. A surface change detection body according to claim 10, wherein the second incidence and reflection portion is spaced apart from the first incidence and reflection portion.

16. A surface change detection body according to claim 10, wherein the incidence and reflection unit comprises a bow-tie antenna having a planar shape of isosceles right triangles, each of the triangles of the bow-tie antenna being formed from a separate conductor pattern.

* * * * *